United States Patent [19]

Takahashi et al.

[11] Patent Number: 5,240,984
[45] Date of Patent: Aug. 31, 1993

[54] SILICON RUBBER COMPOSITION

[75] Inventors: Masaharu Takahashi; Naoki Omura, both of Annaka, Japan

[73] Assignee: Shin-Etsu Chemical Co., Ltd., Tokyo, Japan

[21] Appl. No.: 689,524

[22] Filed: Apr. 23, 1991

[30] Foreign Application Priority Data

Apr. 24, 1990 [JP] Japan .................................. 2-107845

[51] Int. Cl.$^5$ .............................................. C08K 5/54
[52] U.S. Cl. .................................... 524/266; 524/268; 524/588; 525/477; 525/478
[58] Field of Search ................ 525/478, 477; 524/266, 524/268, 588

[56] References Cited

U.S. PATENT DOCUMENTS

| 4,384,068 | 5/1983 | Bouverot et al. | 524/588 |
| 4,496,680 | 1/1985 | Ashby | 524/266 |
| 4,830,925 | 5/1989 | Swihart et al. | 525/478 |

Primary Examiner—Melvyn I. Marquis
Assistant Examiner—D. Aylward
Attorney, Agent, or Firm—Oblon, Spivak, McClelland, Maier & Neustadt

[57] ABSTRACT

The silicone rubber composition of the present invention is characterized by using a diorganopolysiloxane having an average degree of polymerization of 3,000 to 30,000 in combination with a low-molecular weight of phenyl-group-containing organopolysiloxane having the following formula:

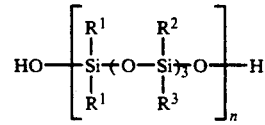

wherein $R^1$ represents a phenyl group, $R^2$ and $R^3$ each represent a monovalent hydrocarbon group having 1 to 10 carbon atoms, and n is 1 or 2.

The composition can form a vulcanized molded item having excellent properties such as excellent storage stability, heat resistance, and fire resistance without causing blooming.

10 Claims, 1 Drawing Sheet

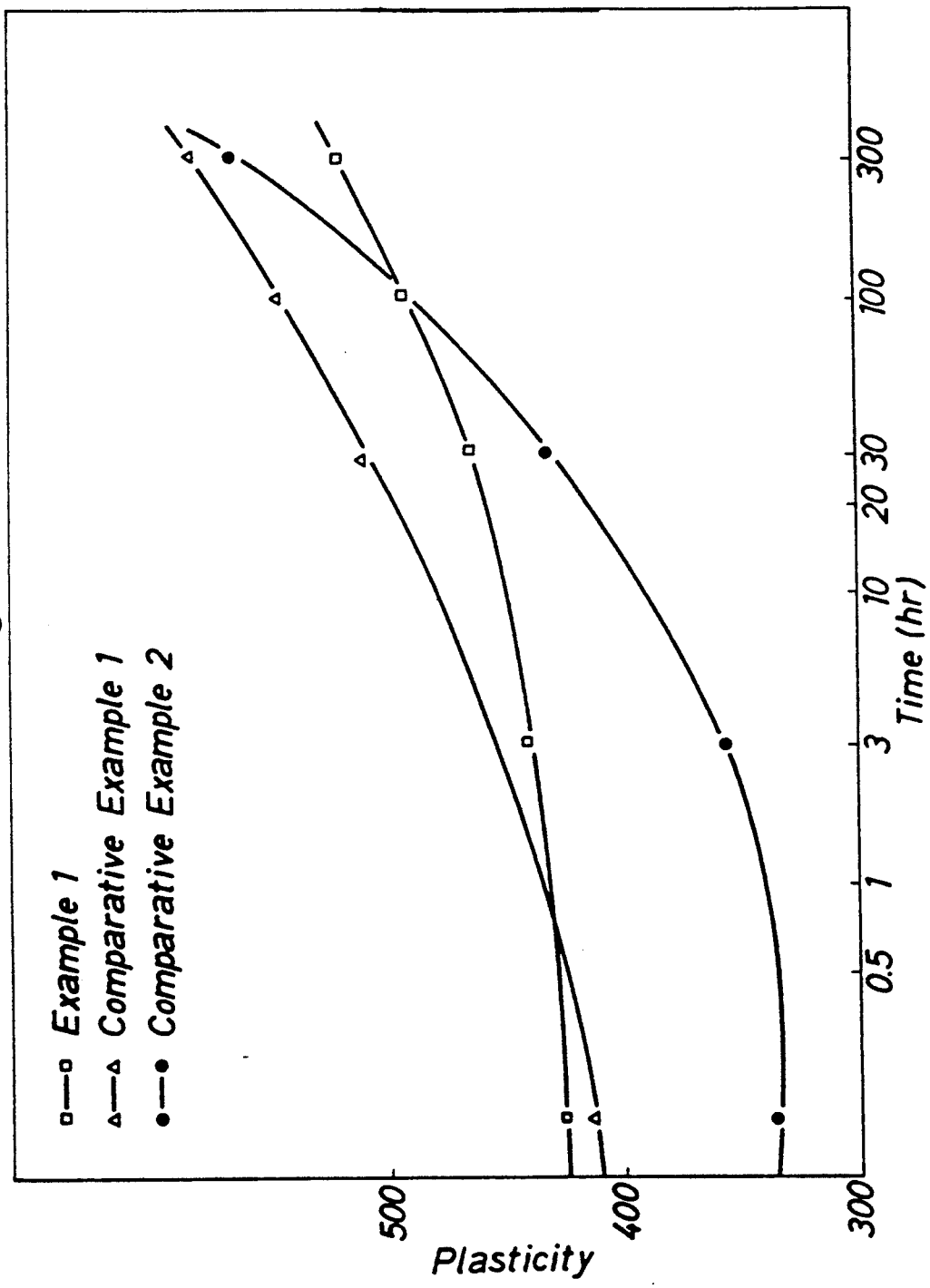

SILICON RUBBER COMPOSITION

BACKGROUND OF THE INVENTION

1. Field of the Invention

The present invention relates to a silicone rubber composition which, when cured, can provide vulcanized molded items excellent in heat resistance and fire retardancy and to its cured product.

2. Description of the Prior Art

Silicone rubbers are excellent in heat resistance in comparison with common organic rubbers such as butadiene rubber and isoprene rubber and are widely used in the application where heat resistance is required for example in fire-resisting gaskets and oil seals of motorcars.

It is known that by adding a phenyl-group-containing polysiloxane to a silicone component of a silicone rubber the silicone rubber is provided with refractoriness, fire resistance, and radioactivity resistance. It is also known that the properties such as the heat resistance and fire resistance are further improved by using as a dispersant a phenyl-group-containing polysilanol such as diphenylsilanediol and phenylmethylsilanediol.

Generally, when a phenyl-group-containing polysiloxane is used, it is required to use the above-mentioned phenyl-group-containing polysilanol as a dispersant in order to improve the compatibility.

Further, the phenyl-group-containing polysilanol as mentioned above has a defect that since it is solid at normal temperatures it does not function as a dispersant if it is not heated and it must be used in combination with other dispersant. In addition, diphenylsilanediol, phenylmethylsilanediol, and the like change to more stable cyclic compounds such as 1,1,3,3,5,5-hexaphenylcyclotrisiloxane and 1,3,5-trimethyl-1,3,5-triphenylcyclotrisiloxane under the conditions wherein an acid owing to a filler is present and therefore blooming occurs on the obtained vulcanized molded item.

SUMMARY OF THE INVENTION

Therefore, the present invention intends to provide a silicone rubber composition which can provide vulcanized molded items that are excellent in shelf stability without having blooming and have excellent properties such as heat resistance and fire retardancy and its cured product.

That is, according to the present invention, there is provided a silicone composition comprising:

(A) a diorganopolysiloxane having the following average 0 composition formula [I]:

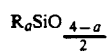 [I]

wherein R's, which may be the same or different, each represent a substituted or unsubstituted monovalent hydrocarbon group having 1 to 10 carbon atoms and a is a number of from 1.95 to 2.05 and an average degree of polymerization in the range of 3,000 to 30,000, (B) a low-molecular weight phenyl-group-containing organopolysiloxane having the following formula [II]:

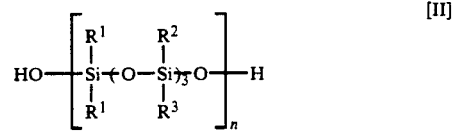

wherein $R^1$ represents a phenyl group, $R^2$ and $R^3$, which may be the same or different, each represent a substituted or unsubstituted monovalent hydrocarbon group, and n is an integer of 1 or 2, and (C) a filler, and its cured product.

It is not required to use a dispersant such as diphenylsilanediol and phenylmethylsilanediol, according to the invention.

BRIEF DESCRIPTION OF SEVERAL VIEWS OF THE DRAWING

FIG. 1 is a chart showing the results of the measurement of the plasticities in Example 1 and Comparative Examples 1 and 2.

DETAILED DESCRIPTION OF PREFERRED EMBODIMENTS

(A) Diorganopolysiloxanes

The diorganopolysiloxane used as a base component in the present invention is one having the above-mentioned average composition formula [I] represented by

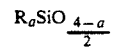 [I]

wherein R and a are as defined above.

The average composition formula will now be described in more detail. The group R represents a substituted or unsubstituted monovalent hydrocarbon group having 1 to 10, preferably 1 to 8, carbon atoms for example an alkyl group such as a methyl group, an ethyl group, a propyl group, and a butyl group, an alkenyl group such as a vinyl group, an allyl group, and a butenyl group, an aryl group such as a phenyl group and a tolyl group, or a substituted hydrocarbon group formed by substituting part or all of the hydrogen atoms bonded to the carbon atoms of these groups by a halogen atom(s), a cyano group(s), or the like such as a chloromethyl group, a chloropropyl group, a 3,3,3-trifluoropropyl group and a 2-cyanoethyl group.

a is a number in the range of 1.95 to 2.05. Although the groups R's may be the same or different, generally preferably, out of all the groups R's, 98 mol % or over are alkyl groups having 1 to 4 carbon atoms, in particular methyl groups. Groups other than those alkyl groups preferably are a vinyl group, a phenyl group, and a 3,3,3-trifluoropropyl group.

The molecular structure of the diorganopolysiloxane (A) is preferably linear but it may contain a branched molecular structure partially.

The degree of polymerization of the diorganopolysiloxane (A) is 3,000 to 30,000, and desirably 4,000 to 10,000 in view of workability.

(B) Low-Molecular Weight Phenyl-Group-Containing Organopolysiloxanes

In the present silicone rubber composition, it is a remarkable feature that a low-molecular weight phenylgroup-containing organopolysiloxane represented by the following formula [II]:

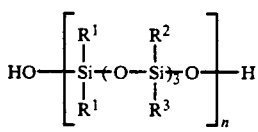

wherein $R^1$ to $R^3$ and n are as defined above is used.

In The organopolysiloxane (B) represented by formula [II], the group $R^1$ is a phenyl group and there are at least two phenyl groups in the molecule. That is, due to the presence of the phenyl groups, excellent properties such as heat resistance and fire resistance can be secured.

The groups $R^2$ and $R^3$ each represent a substituted or unsubstituted monovalent hydrocarbon group having 1 to 10, preferably 1 to 8, carbon atoms and the monovalent hydrocarbon group includes for example an alkyl group such as a methyl group and an ethyl group, an alkenyl group such as a vinyl group, an ally group, and an acryl group, an alkenyl-group-containing group, a cycloalkyl group such as a cyclohexyl group and a substituted hydrocarbon group such as a trifluoropropyl group. Out of these groups, a methyl group, a vinyl group, and a phenyl groups are preferable. The groups $R^2$ and $R^3$ may be the same.

n is an integer of 1 or 2 and particularly preferably n is 1.

If n is greater than 2, since the content of the silanol groups in the molecule decreases, it becomes required to add a large amount of the dispersant, which leads to the occurrence of blooming, lowering of the plasticity of the unvulcanized rubber, lowering of the rollability, etc.

Since the phenyl-group-containing organopolysiloxane used as the component (B) in the present invention has a low molecular weight, is liquid at normal temperatures, and possesses a silanol group at both ends of the molecular chain, it functions effectively as a dispersant and can obviate the occurrence of blooming without using other dispersant additionally.

The low-molecular weight phenyl-group-containing organopolysiloxane as mentioned above includes specifically for example 1,1-diphenyl-3,3,5,5,7.7-hexamethyl-1,7-dihydoxytetrasiloxane, 1,1-diphenyl-3,3,5,5,7,7-hexavinyl-1,7-dihydroxytetrasiloxane, 1,1,7,7-tetraphenyl-3,3,5,5-tetramethyl-1,7-dihydroxytetrasiloxane, 1,1,9,9-tetraphenyl-3,3,5,5,7,7,11,11,13,13,15,15-dodecamethyl-1,15-dihydroxyoctasiloxane, and 1,1,15,15-tetraphenyl-3,3,5,5,7,7,9,9,11,11,13,13-dodecamethyl-1,15-dihydroxyoctasiloxane.

These low-molecular weight phenyl-group-containing organopolysiloxanes are used singly or as a mixture of two or more and preferably are used in an amount of 0.1 to 20 parts by weight, particularly 5 to 10 parts by weight, per 100 parts by weight of the diorganopolysiloxane (A).

To obtain the organopolysiloxane that is the component (B), for example, a dihalopolysiloxane represented by the following formula [III]:

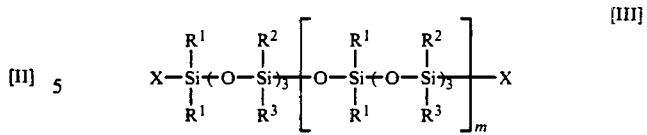

wherein $R^1$ to $R^3$ each are as defined above, X represents a halogen atom, and m is an integer of 0 or 1, is hydrolized. The hydrolyzing process includes for example a process wherein a dihalopolysiloxane is added dropwise to an aqueous sodium bicarbonate solution or a mixture of propylene oxide and water.

(C) Fillers

The filler (C) is used for the purpose, for example, of reinforcing the silicone rubber, of thickening, of improving the workability, and of filling. The filler includes those used conventionally in silicone rubbers. Particularly, a silica finely divided powder filler such as fumed silica, wet process, quartz finely divided powder, and diatomaceous earth are preferable. The surface of these silica fillers may be treated, for example, with a silane, a siloxane or a silazane containing a trimethylsilyl group, a dimethylsilyl group, a mcnomethylsilyl group, a diphenylmethyl group, or the like to be made hydrophobic. These fillers may be used singly or as a mixture of two or more and for example a mixture of the above silica filler with a small amount of calcium carbonate, carbon black, glass fiber, or the like is also preferably used.

The filler to be used in the present invention preferably has a specific surface area of at least 50 m²/g.

These fillers are desirably used in an amount of 15 to 100 parts by weight, particularly 15 to 50 parts by weight, per 100 parts by weight of the diorganopolysiloxane that is the component (A). If the amount is smaller than 15 parts by weight, the reinforcing effect is not adequate and the workability is insufficient, while if the amount is more than 100 parts by weight, working properties such as mold flowability and extrudability sometimes drop extremely.

Curing Agents

To cure the present silicone composition, a curing agent is added. The curing agent may be one generally used for curing silicone rubber compositions. Specifically, an organic peroxide or a combination of an organohydrogenpolysiloxane with a platinum family metal catalyst is used.

Examples of the organic peroxide include benzoyl peroxide, monochlorobenzoyl peroxide, p-methylbenzoyl peroxide, 2,4-dichlorobenzoyl peroxide, t-butyl perbenzoate, dicumyl peroxide, 2,5-bis-(t-butylperoxy) 2,5-dimethylhexane, 2,5-bis-(t-butylperoxy) 2,5-dimethylhexine, dicarbonates such as dimyristyl peroxycarbonate and dicyclododecyl peroxydicarbonate, t-butyl monooxycarbonates, and compounds represented by the following formula:

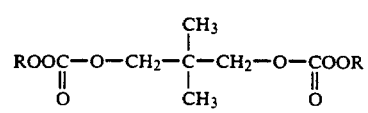

wherein R represents a monovalent hydrocarbon group having 3 to 10 carbon atoms, which may be used singly or as a mixture of two or more. Generally the amount of these organic peroxides to be blended is 0.5 to 5 parts by weight per 100 parts by weight of the diorganopolysiloxane that is the component (A).

In the case wherein the diorganopolysiloxane used as the component (A) contains an alkenyl group such as a vinyl group or an ally group in the molecule, it is desirable to use as a curing agent a combination of an organohydrogenpolysiloxane having two or more silicon-bonded hydrogen atoms in the molecule and a platinum family metal catalyst.

The platinum family metal catalyst includes, for example, a platinum catalyst, a palladium catalyst, and a rhodium catalyst, among which a platinum catalyst is preferred. The platinum catalyst includes, for example, platinum black, solid platinum supported on a carrier such as alumina or silica, chloroplatinic acid, alcohol-modified chloroplatinic acid, a complex of an olefin with chloroplatinic acid, and a complex of platinum with vinylsiloxane. The amount of these platinum family metal catalyst to be blended is 0.5 to 500 ppm, particularly 2 to 200 ppm, in terms of the platinum family metal based on the diorganopolysiloxane that is the component (A).

As the organohydrogenpolysiloxane, for example, one represented by the following average composition formula [IV]:

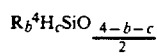

$$R_b^4 H_c SiO_{\frac{4-b-c}{2}} \quad [IV]$$

wherein $R^4$ represents a substituted or unsubstituted monovalent hydrocarbon group having 1 to 10 carbon atoms and b and c each are a positive number provided that b+c is 1.0 to 3.0, and having at least two silicon-bonded hydrogen atoms in the molecule is used. In the average composition formula [IV], preferable examples of the group $R^4$ include an alkyl group such as a methyl group, an ethyl group, a propyl group, and a butyl group, an aryl group such as a phenyl group and a tolyl group, and a 3,3,3-trifluoropropyl group.

The degree of polymerization of the organohydrogenpolysiloxane is desirably 300 or below and the molecular structure thereof may be linear, cyclic, or branched.

The amount of the organohydrogenpolysiloxane to be blended is preferably in the range of 50 to 300 mol % in terms of the amount of silicon-bonded hydrogen atoms based on the molar amount of the alkenyl group of the component (A).

Other Ingredients

In the present silicone rubber composition, various additives, for example, a heat resistance improver such as iron oxide, selenium oxide, iron octylate, and titanium oxide, a pigment for coloring, a fire retardance auxiliary such as a platinum compound and a palladium compound, and other similar additives that are conventionally mixed in silicone rubber compositions may be used.

Preparation of the Silicone Rubber Composition

The present silicone rubber composition can be easily prepared by uniformly kneading prescribed amounts of the above components by using a kneading machine such as a two-roll mill, a kneader, a pressurized kneader, a Banbury mixer, and a continuous kneader. The curing agent may be blended immediately before the vulcanization molding.

Uses

The present silicone rubber composition is quite useful in the application where heat resistance and fire resistance are required for example in fire-resisting gaskets and oil seals of motorcars.

EXAMPLES

Synthesis Example 1

689 g (11.9 mol) of propylene oxide and 72 g (4.0 mol) of water were placed in a 2-liter round flask equipped with a dropping funnel, a water condenser, and a mechanical stirrer and were stirred for 10 minutes under normal pressures at room temperature.

Then, 855 g (1.8 mol) of 1,1-diphenyl-3,3,5,5,7,7-hexamethyl-1,7-dichlorotetrasiloxane was added dropwise over 3 hours while cooling with ice not to allow the temperature to exceed 30° C. and the mixture was stirred for 2 hours.

Further, an excess of $MgSO_4$ was added to dry it followed by filtering. The filtrate obtained by the filtration was stripped at 80° C. under 5 mmHg to yield 700 g of 1,1-diphenyl-3,3,5,5,7,7,-hexamethyl-1,7-dihydroxytetrasiloxane that was a colorless transparent liquid. The liquid is referred to as an additive (B1) hereinafter.

Synthesis Example 2

18.5 g (0.22 mol) of sodium bicarbonate and 180 g (10.0 mol) of water were placed in a 500-ml round flask equipped with a dropping funnel, a water condenser, and a mechanical stirrer and the sodium bicarbonate was dissolved well.

Further, 47.5 g (0.10 mol) of 1,1-diphenyl-3,3,5,5,7,7-hexamethyl-1,7-dichlorotetrasiloxane was added dropwise over 3 hours while cooling with ice not to allow the temperature to exceed 30° C. and the mixture was stirred for 2 hours.

Then, 100 ml of toluene was added, the toluene layer was washed twice with 100 ml of water, and an excess of $MgSO_4$ was added to the toluene layer to dry it.

The solution was filtered and the filtrate was stripped to yield a liquid of a mixture of 1,1-diphenyl-3,3,5,5,7,7-hexamethyl-1,7-dihydroxytetrasiloxane and its dimers, 1,1,9,9-tetraphenyl-3,3,5,5,7,7,11,11,13,13,15,15-dodecamethyl-1,15-dihydroxyoctasiloxane and 1,1,15,15-tetraphenyl-3,3,5,5,7,7,9,9,11,11,13,13-dodecamethyl-1,15-dihydroxyoctasiloxane. This liquid is referred to as an additive (B2) hereinafter.

EXAMPLE 1

100 parts by weight of a methylvinylpolysiloxane, as the diorganopolysiloxane that is the component (A), which comprises 99.85 mol % of $(CH_3)_2SiO$ units and 0.15 mol % of $(CH_3)(CH_2=CH)SiO$ units, whose molecular chain ends are blocked with $(CH_2=CH)(CH_3)_2SiO$ units and whose viscosity is 10,000,000 cSt (25° C.) and 8.0 parts by weight of the additive (B1) were placed in a kneader mixer.

Then, 55 parts by weight of fumed silica (Aerosil 200 manufactured by Nippon Aerosil Corp.) having a specific area of 200 m²/g was charged thereinto, and after they were kneaded until the mixture became uniform, the mixture was heat-treated for 2 hours at 170° C. to obtain a base composition. With respect to the base composition, the Williams plasticity was measured with time in accordance with JIS K-6300 and the results are shown in FIG. 1.

1.5 parts by weight of 2,4-dichlorobenzoyl peroxide was added to 100 parts by weight of that base composition and they were mixed uniformly by a two-roll mill to obtain a composition.

From the obtained composition, a 150 mm×200 mm sheet having a thickness of 2 mm was made by press curing under the conditions of 120° C. and 10 minutes.

It was postcured under the conditions of 200° C. and 4 hours.

Under the same conditions, test specimens for compression set of JIS K-6301 were made.

Mechanical properties of these test specimens were measured in accordance with JIS K-6301. Also the test specimens were heat-treated at 250° C./24 hr, mechanical properties thereof were measured in the same manner, and the rates of changes of the measurements after the heat treatment based on the measurements before the heat treatment were calculated. The compression set was measured under the conditions of 180° C./22 hr in accordance with JIS K-6301. The obtained results are shown in Table 1.

The workability of the base composition, the transparency of the vulcanized sheet, and the stickiness and the blooming properties of the sheet surface of the vulcanized sheet were visually observed after the postcuring and the results are also given in Table 1.

Comparative Examples 1 and 2

Example 1 was repeated, except that, in place of the additive (B1), 4.0 parts by weight of diphenylsilanediol (Comparative Example 1) or 10.0 parts by weight of a linear dimethylpolysiloxane endblocked with hydroxy groups and having a degree of polymerization of 10 to 20 (Comparative Example 2) was used, thereby preparing base compositions. From the obtained base compositions, sheets and test specimens were made in the same manner as in Example 1, and they were tested in the same manner as in Example 1. The results are shown in Table 1 and FIG. 1.

TABLE 1

|  | Example 1 | Comparative Example 1 | Comparative Example 2 |
|---|---|---|---|
| Workability of the base composition | good | good | good |
| Press-cured at 120° C./10 min |  |  |  |
| Hardness (Shore A) | 63 | 60 | 61 |
| Tensile strength (Kg/cm²) | 101 | 95 | 90 |
| Elongation (%) | 470 | 370 | 430 |
| Tear strength (Kg/cm) | 22 | 22 | 20 |
| Postcured at 200° C./4 hr |  |  |  |
| Hardness (Shore A) | 67 | 68 | 66 |
| Tensile strength (Kg/cm²) | 116 | 86 | 93 |
| Elongation (%) | 380 | 300 | 380 |
| Tear strength (Kg/cm) | 23 | 20 | 23 |
| Impact resilience (%) | 39 | 43 | 39 |
| Stickiness of the sheet | not sticky | sticky | sticky |
| Transparency of the sheet | good | poor | poor |
| Blooming of the sheet surface | not observed | not observed | observed a little |
| Heat-treated at 250° C./24 hr |  |  |  |
| Rate of change of hardness (%) | +8 | +9 | +8 |
| Rate of change of tensile strength (%) | −31 | −31 | −31 |
| Rate of change of elongation (%) | −56 | −63 | −68 |
| Heat-treated at 180° C./22 hr Compression set (%) | 53 | 62 | 68 |

EXAMPLE 2

100 parts by weight of methylvinylpolysiloxane that was the same as used in Example 1, 6.0 parts by weight of the additive (B2), and 1 parts by weight of a fire retardance auxiliary containing an N-(2-aminoethyl)-aminopropyl group were placed in a pressurized kneader.

Then, 38 parts by weight of a dry filler having a specific area of 200 m²/g (A-200, manufactured by Nippon Aerosil Corp.) was charged thereinto, and after they were kneaded uniformly, the mixture was heat-treated at 170° C. for 2 hours to remove volatile components to obtain a base composition. With respect to that base composition, the Williams plasticity was measured in accordance with JIS K-6300 and the results of the measurements after 10 minutes, 4 hours, and 70 hours are shown in Table 2.

1.0 parts by weight of a 2% solution of chloroplatinic acid in 2-ethylhexanol and 1.4 parts by weight of 2,4-dichlorobenzoyl peroxide were added to 100 parts by weight of that base composition and they were mixed uniformly by a two-roll mill.

From the resulting composition, sheets for the test of mechanical properties were made by carrying out press-curing at 120° C. for 10 minutes and then postcuring at 150° C. for 1 hour. Using the sheet, mechanical properties were measured in the same way as in Example 1. The test of fire retardancy was carried out based on VL-94 and the fire retardancy was assessed. The sheet was also heat-treated under the conditions of 220° C./96 hr and 250° C./6 hr, then mechanical properties thereof were measured similarly, and the rates of changes of the mechanical properties were determined in the same manner as in Example 1. The results are shown in Table 2.

Comparative Example 3

Example 2 was repeated, except that, in place of the additive (B2), 3.0 parts by weight of diphenylsilanediol was used, thereby preparing a base composition. From the obtained base composition, sheets and test specimens were made in the same manner as in Example 2, and they were tested in the same manner as in Example 2. The results are shown in Table 2.

TABLE 2

|  | Example 2 | Comparative Example 3 |
|---|---|---|
| Plasticity of the base composition |  |  |
| After 10 min | 275 | 278 |
| After 4 hr | 295 | 318 |
| After 70 hr | 305 | 405 |
| Postcured at 150° C./hr |  |  |
| Hardness (Shore A) | 59 | 59 |
| Elongation (%) | 340 | 360 |
| Tensile strength (Kg/cm²) | 83 | 87 |
| Tear strength | 16 | 15 |
| Blooming of the sheet | not observed | observed |
| Fire retardance (UL-94) | V-1 | V-1 |

TABLE 2-continued

|  | Example 2 | Comparative Example 3 |
|---|---|---|
| Heat-treated at 200° C./96 hr |  |  |
| Change of hardness (points) | +7 | +8 |
| Rate of change of elongation (%) | −49 | −49 |
| Rate of change of tear strength (%) | −18 | −17 |
| Heat-treated at 250° C./6 hr |  |  |
| Change of hardness (points) | +4 | +5 |
| Rate of change of elongation (%) | −20 | −27 |
| Rate of change of tear strength (%) | +3 | 0 |

We claim:

1. A silicone rubber composition comprising:

(A) a diorganopolysiloxane having the following average composition formula [I]:

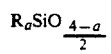   [I]

wherein R's, which may be the same or different, each represent a substituted or unsubstituted monovalent hydrocarbon group having 1 to 10 carbon atoms and a is a number of from 1.95 to 2.05 and an average degree of polymerization in the range of 3,000 to 30,000, (B) a low-molecular weight phenyl-group-containing organopolysiloxane having the following formula [II]:

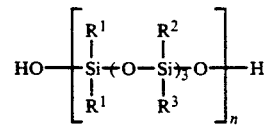   [II]

wherein $R^1$ represents a phenyl group, $R^2$ and $R^3$, which may be the same or different, each represent a substituted or unsubstituted monovalent hydrocarbon group, and n is an integer of 1 or 2, and (C) a filler.

2. A silicone rubber cured product formed by curing a composition as claimed in claim 1.

3. A composition as claimed in claim 1, wherein, out of all the groups R's of the diorganopolysiloxane (A) represented by formula [I], 98 mol % or more are alkyl groups having 1 to 4 carbon atoms.

4. A composition as claimed in claim 1, wherein the diorganopolysiloxane (A) is linear.

5. A composition as claimed in claim 1, wherein the average degree of polymerization of the diorganopolysiloxane (A) is 4,000 to 10,000.

6. A composition as claimed in claim 1, wherein n of the phenyl-group-containing organopolysiloxane (B) represented by formula [II] is 1.

7. A composition as claimed in claim 1, wherein the filler (C) is a silica finely divided filler.

8. A composition as claimed in claim 1, wherein an organic peroxide is blended as a curing agent.

9. A composition as claimed in claim 1, wherein, as a curing agent, a hydrogenpolysiloxane having at least two or more silicon-bonded hydrogen atoms in the molecule and a platinum catalyst are blended.

10. A composition as claimed in claim 1, 0.1 to 20 parts by weight of the phenyl-group-containing organopolysiloxane (B) and 15 to 100 parts by weight of the filler (C) are contained per 100 parts by weight of the diorganopolysiloxane (A).

* * * * *